US010576901B2

(12) United States Patent
Aftanas et al.

(10) Patent No.: US 10,576,901 B2
(45) Date of Patent: Mar. 3, 2020

(54) VEHICLE ARTICLE CARRIER HAVING SWING-IN-PLACE AND STOWABLE CROSS BARS

(71) Applicant: JAC Products, Inc., Saline, MI (US)

(72) Inventors: Jeffrey M. Aftanas, Ortonville, MI (US); Gordon Michie, LaSalle (CA)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 15/862,288

(22) Filed: Jan. 4, 2018

(65) Prior Publication Data
US 2018/0201199 A1 Jul. 19, 2018

Related U.S. Application Data

(60) Provisional application No. 62/447,062, filed on Jan. 17, 2017.

(51) Int. Cl.
B60R 9/045 (2006.01)
B60R 9/052 (2006.01)
(Continued)

(52) U.S. Cl.
CPC ............. B60R 9/045 (2013.01); B60R 9/052 (2013.01); F16B 21/04 (2013.01); B60R 9/048 (2013.01); F16B 5/0208 (2013.01)

(58) Field of Classification Search
CPC ......... B60R 9/045; B60R 9/052; B60R 9/048; B60R 9/04; B60R 9/05; B60R 9/058; F16B 21/04; F16B 5/0208; Y10T 403/7009
(Continued)

(56) References Cited

U.S. PATENT DOCUMENTS 3,512,082 A 5/1970 Joos
5,071,050 A 12/1991 Pudney et al.
(Continued)

FOREIGN PATENT DOCUMENTS

FR 2932439 12/2009

OTHER PUBLICATIONS

Preliminary Search Report issued by the French Patent Office in corresponding French Patent Application No. 18 50307, Nov. 29, 2019.

Primary Examiner — Nathan J Newhouse
Assistant Examiner — Matthew T Theis
(74) Attorney, Agent, or Firm — Harness, Dickey & Pierce, P.L.C.

(57) ABSTRACT

A vehicle article carrier is disclosed which has a first pair of support elements and a second pair of support elements secured to an outer body surface of a vehicle. A pair of cross bar assemblies may be secured in either stowed orientations, in which the cross bar assemblies are each secured to one of the first pair of support elements and one of the second pair of support elements, or an operative configuration in which one of the cross bar assemblies is secured to the first pair of support elements while the other is secured to the second pair of support elements. One of the cross bar assemblies may be pivotally attached at one end to one of the support elements enabling it to be swung between its stowed and operative positions. The other cross bar assembly may be fully removable from the support elements, and may be attached in two different locations on the second pair of support elements.

17 Claims, 10 Drawing Sheets

(51) Int. Cl.
*F16B 21/04* (2006.01)
*F16B 5/02* (2006.01)
*B60R 9/048* (2006.01)

(58) Field of Classification Search
USPC .......................................................... 224/321
See application file for complete search history.

(56) References Cited

U.S. PATENT DOCUMENTS

| | | |
|---|---|---|
| 5,377,890 A | 1/1995 | Brunner et al. |
| 5,765,977 A * | 6/1998 | Reynard ................ B60P 7/132 |
| | | 410/70 |
| 6,811,066 B2 | 11/2004 | Aftanas et al. |
| 6,959,845 B2 | 11/2005 | Aftanas et al. |
| 7,066,364 B2 | 6/2006 | Kmita et al. |
| 7,090,103 B2 | 8/2006 | Aftanas et al. |
| 7,448,523 B2 | 11/2008 | Aftanas et al. |
| 8,028,875 B2 | 10/2011 | Kmita et al. |
| 8,096,454 B2 | 1/2012 | Aftanas et al. |
| 8,113,563 B1 | 2/2012 | McCann et al. |
| 8,235,264 B2 | 8/2012 | Aftanas et al. |
| 8,251,267 B2 | 8/2012 | Aftanas et al. |
| 8,276,974 B2 | 10/2012 | Vilcek et al. |
| 8,348,111 B2 | 1/2013 | Heuchert et al. |
| 8,528,799 B2 | 9/2013 | Michie et al. |
| 2008/0257924 A1* | 10/2008 | Kmita .................... B60R 9/045 |
| | | 224/309 |
| 2008/0308590 A1* | 12/2008 | Aftanas .................. B60R 9/045 |
| | | 224/330 |

* cited by examiner

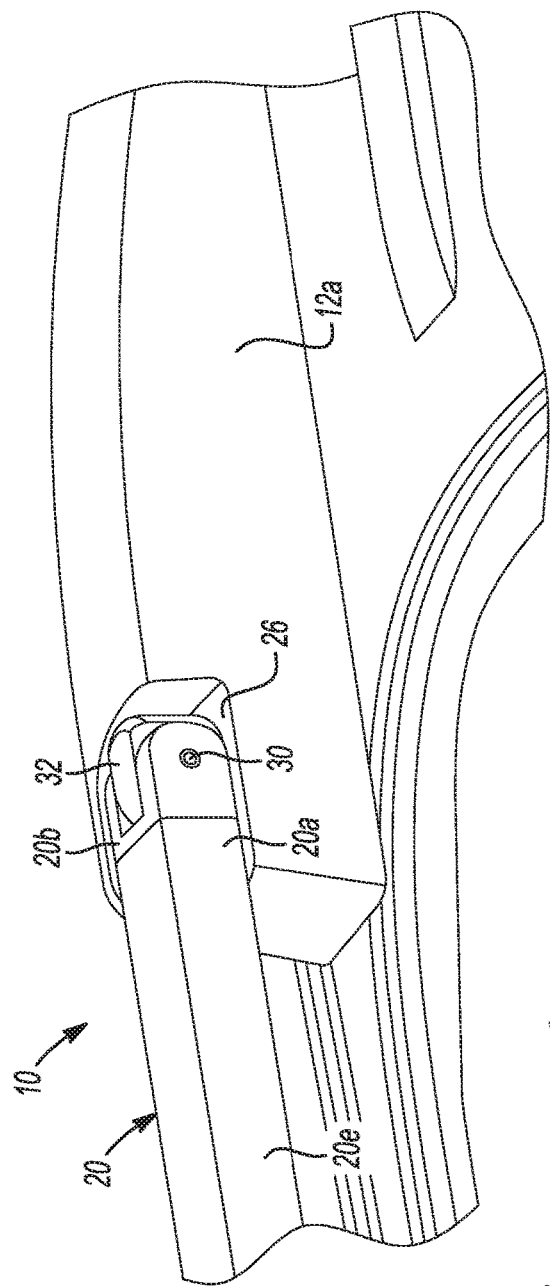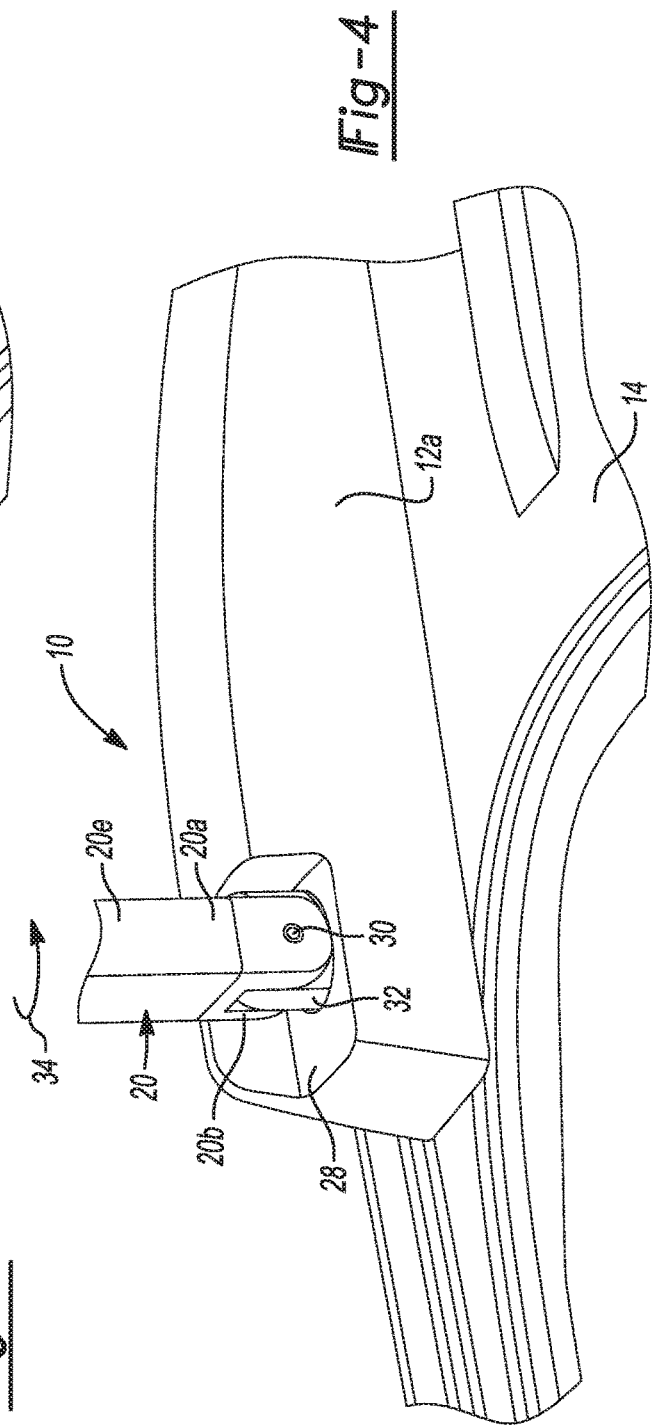

VEHICLE ARTICLE CARRIER HAVING SWING-IN-PLACE AND STOWABLE CROSS BARS

CROSS-REFERENCE TO RELATED APPLICATIONS

This application claims the benefit of U.S. Provisional Application No. 62/447,062, filed on Jan. 17, 2017. The entire disclosure of the above application is incorporated herein by reference.

FIELD

The present disclosure relates to vehicle article carriers, and more particularly to a vehicle article carrier having at least one place cross bar which can be articulated form a stowed position to an operative position when needed for use.

BACKGROUND

The statements in this section merely provide background information related to the present disclosure and may not constitute prior art.

The assignee of the present disclosure is a leader in vehicle article carrier systems. Patents assigned to the assignee of the present disclosure, which relate to article carrier systems having stowable cross bars, include U.S. Pat. Nos. 8,528,799; 8,235,264; 8,348,111; 8,276,974; 8,028,875; 7448,523; 7,090,103; 8,251,267; 8,096,454; 7,066,364; 6,811,066 and 6,959,845, the disclosures of which are hereby incorporated by reference into the present disclosure.

Vehicle article carrier systems with stowable cross bars are growing significantly in popularity. Such systems enable the cross bars to be stowed in position parallel to their associated support rails, and articulated into an operative position extending perpendicularly between the support rails. When in the stowed position, the cross bars and support rails form highly aerodynamically efficient subassemblies and reduce the chance for any wind noise. With a "swing-in-place" vehicle article carrier system, each of the cross bars is further secured at one of its ends to one of the support rails. Thus, there is no possibility of the cross bar being completely detached from the vehicle and left at some location (e.g., the vehicle owner's home), and thus the cross bars will always be available for use. Operating the vehicle with the cross bars in the stowed positions may also help to improve the fuel economy of the vehicle. The ability of the user to quickly and easily change the configuration of the cross bars from a stowed orientation to an operative orientation, without requiring external tools, also adds to the utility and appeal of these article carrier systems.

In view of the strong interest in vehicle article carrier systems with stowable cross bars, there is a continuing interest in enhancing the design and construction of such systems to even further enhance the ease of use of such systems as well as provide systems that may be manufactured even more cost effectively than previous systems.

SUMMARY

This section provides a general summary of the disclosure, and is not a comprehensive disclosure of its full scope or all of its features.

In one aspect the present disclosure relates to a vehicle article carrier system for securing articles elevationally above an outer body surface of a vehicle. The system may comprise first and second support elements secured in spaced apart relation to one another to the outer body surface adjacent a first portion of the vehicle. The system may further comprise second and third rear support elements secured in spaced apart relation to one another to the outer body surface adjacent a second portion of the vehicle. A first cross bar may be secured to the first support element at a first end thereof, and positionable in an operative orientation extending perpendicularly between the first and second support elements, and in a stowed orientation extending parallel to, and secured to, the first and third support elements. A second cross bar may have first and second ends. The first cross bar may include a latching assembly at a second end thereof, and the second cross bar may include latching assemblies at both ends thereof. The second cross bar may be secureable at the first and second ends thereof at two longitudinally spaced apart locations on the third and fourth support elements to enable selective spacing of the second cross bar relative to the first cross bar when the first and second cross bars are in their operative positions.

In another aspect the present disclosure relates to a vehicle article carrier system for securing articles elevationally above an outer body surface of a vehicle. The system may comprise first and second support elements secured in spaced apart relation to one another to the outer body surface adjacent a first portion of the vehicle. Second and third rear support elements may be included which are secured in spaced apart relation to one another to the outer body surface adjacent a second portion of the vehicle. A first cross bar may be pivotally secured to the first support element via a pivot rotation assembly at a first end thereof, and positionable in an operative orientation extending perpendicularly between the first and second support elements, and a stowed orientation extending parallel to the first and third support elements. A second cross bar may be included which has first and second ends. The first cross bar may include a latching assembly at a second end thereof, and the second cross bar may include latching assemblies at the first and second ends thereof. The third and fourth support elements may each include a first operative mounting location at which the second cross bar is attachable to extend perpendicularly between the third and fourth support elements, to provide a first spacing from the first cross bar when the first cross bar is in the operative position. The third and third fourth support elements may also provide a second operative mounting location at which the second cross bar is attachable to extend perpendicularly between the third and fourth support elements, to provide a second spacing from the first cross bar when the first cross bar is in the operative position. The third and fourth support elements may also each provide a stowed mounting location at which the second cross bar is attachable at one end thereof to the fourth support element, and at an opposite end to the second support element to place the second cross bar in stowed position on the second and fourth support elements, and which enables one end of the first cross bar to be secured at the stowed mounting location of the third support element to enable the first cross bar to be pivoted into, and secured in, a stowed position on the first and third support elements. The second cross bar may also include a latching assembly at the first and second ends thereof for securing the second cross bar in either the operative or stowed orientations. The first cross bar may include a latching assembly at one end thereof for removably coupling the second cross bar in either the operative orientation or the stowed orientation.

In still another aspect the present disclosure relates to a vehicle article carrier system for securing articles elevationally above an outer body surface of a vehicle. The system may comprise first and second support elements secured in spaced apart relation to one another to the outer body surface adjacent a first portion of the vehicle. Second and third rear support elements may be included which are secured in spaced apart relation to one another to the outer body surface adjacent a second portion of the vehicle. A first cross bar may be included which is pivotally secured to the first support element via a pivot rotation assembly at a first end thereof, and positionable in an operative orientation extending perpendicularly between the first and second support elements, and a stowed orientation extending parallel to the first and third support elements. The pivot rotation assembly enables rotation of the first cross simultaneously about two orthogonal axes, and limits pivotal movement to a predetermined degree about one of the two axes. A second cross bar having first and second ends thereof. The first cross bar may include a latching assembly at a second end thereof, and the second cross bar may include latching assemblies at both ends thereof. The second and third support elements may each include a first operative mounting location at which the second cross bar is attachable to extend perpendicularly between the third and fourth support elements, to provide a first spacing from the first cross bar when the first cross bar is in the operative position. A second operative mounting location is provided one each of the third and fourth support elements at which the second cross bar is attachable to extend perpendicularly between the third and fourth support elements, to provide a second spacing from the first cross bar when the first cross bar is in the operative position. A stowed mounting location is provided at which the second cross bar is attachable at the first end thereof, and at the second end thereof to the second support element to place the second cross bar in the stowed position on the second and fourth support elements, and to also enable one end of the first cross bar to be secured to the stowed mounting location of the third support element to enable the first cross bar to be pivoted into, and secured in, a stowed position on the first and third support elements. The second cross bar may include a latching assembly at each end thereof for securing the second cross bar in either the operative or stowed orientations. The first cross bar may include a latching assembly at one end thereof for removably coupling the second cross bar in either the operative orientation or the stowed orientation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is an enlarged perspective view of one of the cross bar assemblies showing its pivotal attachment to one of the front support elements;

FIG. 4 is a view of the end of the cross bar assembly shown in FIG. 3 but with the cross bar assembly lifted into a vertical orientation during the process of moving the cross bar assembly from its stowed position into its operative position;

DETAILED DESCRIPTION

Figure 1:
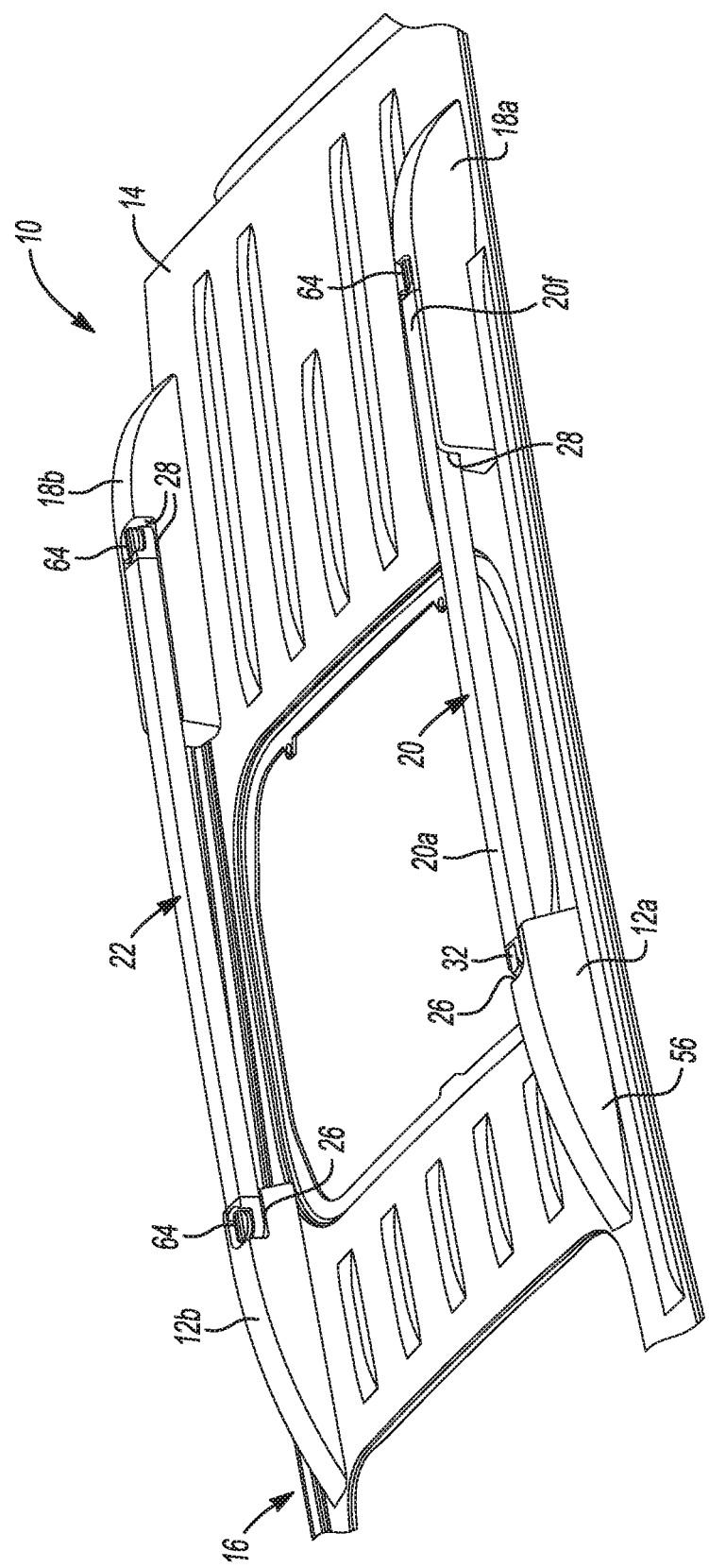
FIG. 1 is a perspective view of a portion of a motor vehicle on which is mounted a vehicle article carrier system in accordance with one embodiment of the present disclosure, and wherein the vehicle article carrier system has a pair of cross bars mounted in a stowed orientation.

The following description is merely exemplary in nature and is not intended to limit the present disclosure, application, or uses. It should be understood that throughout the drawings, corresponding reference numerals indicate like or corresponding parts and features.

Figure 2A:
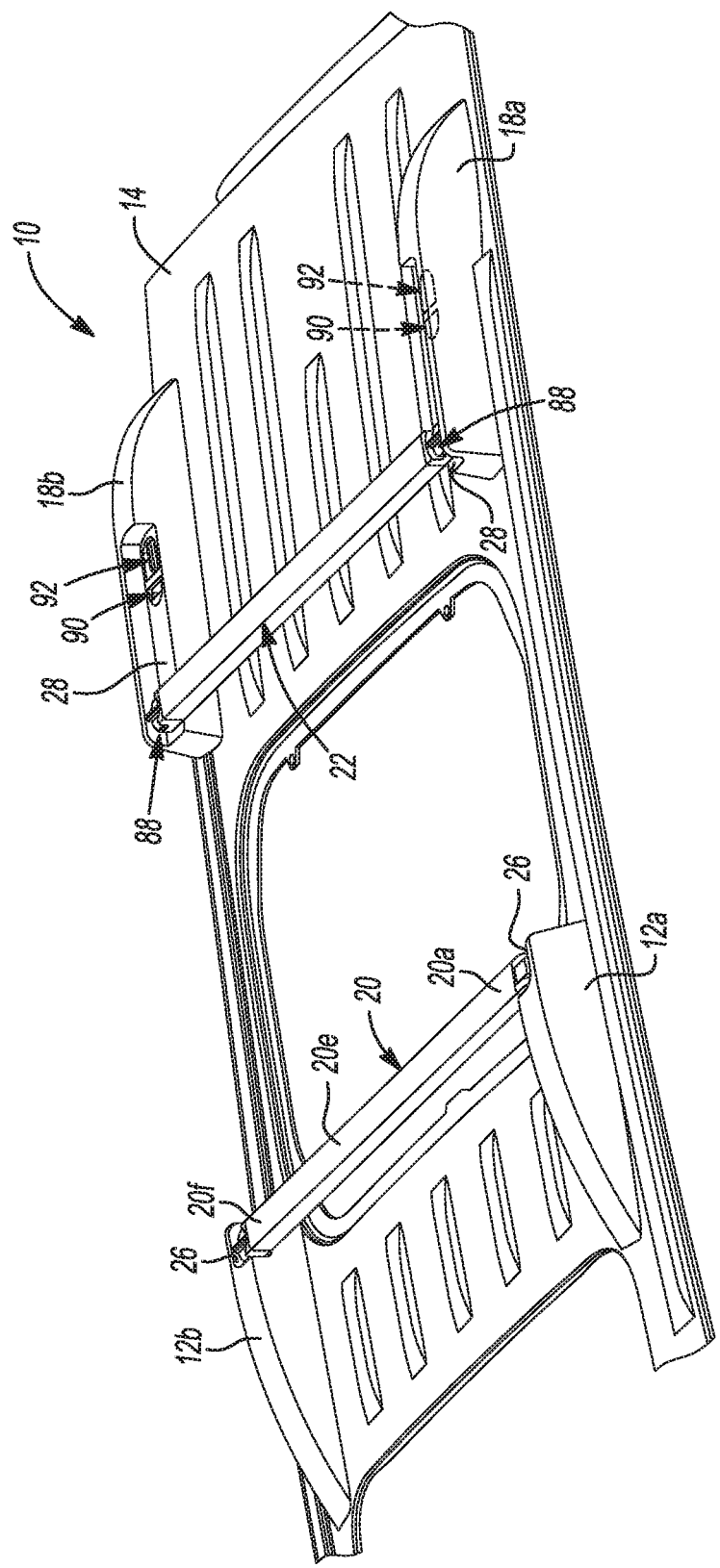
FIG. 2A is a perspective view of the vehicle article carrier system of FIG. 1 but with a removable rear cross bar assembly of the system shown mounted at a first mounting location on a pair of rear support elements of the system.
Figure 2B:
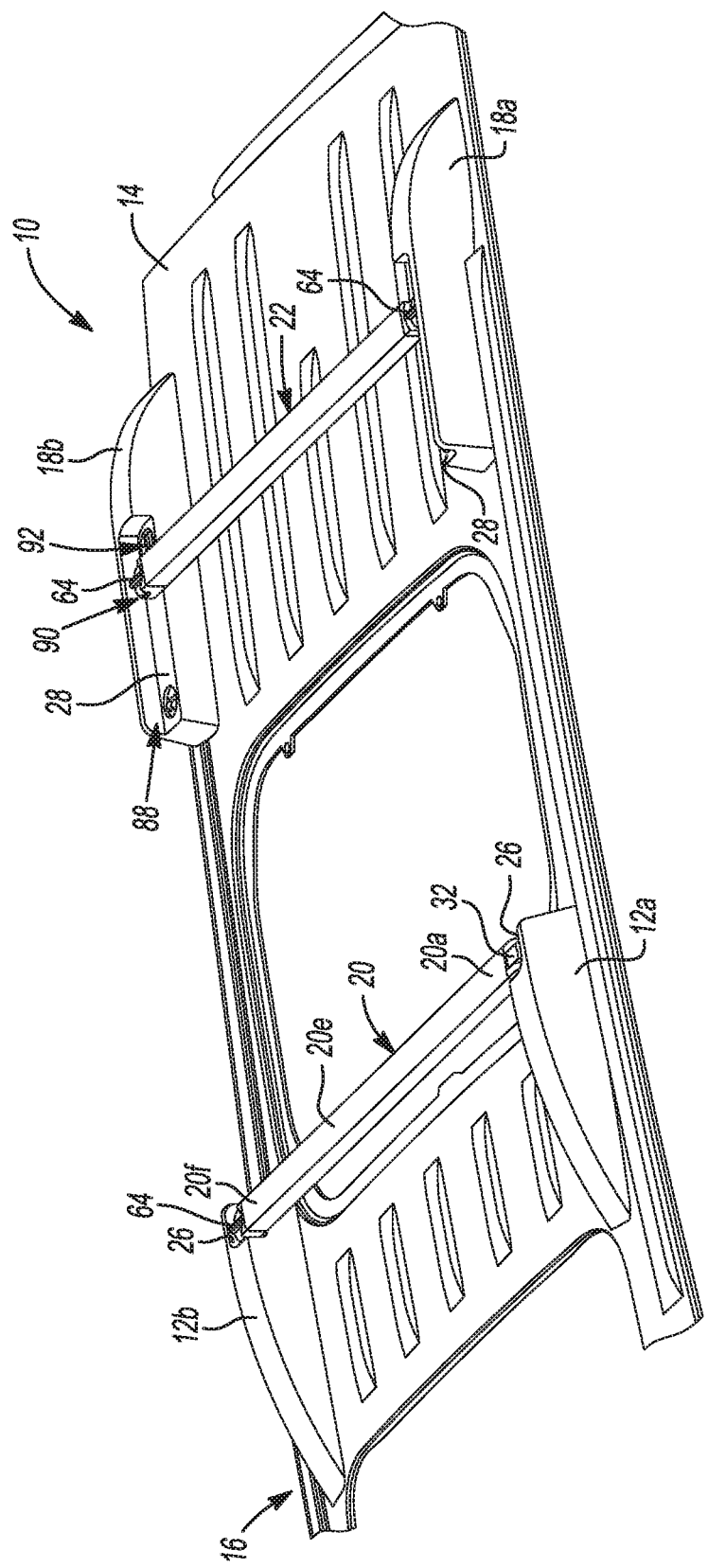
FIG. 2B shows the vehicle article carrier of FIG. 2A but with the removable rear cross bar assembly mounted at a second mounting location on the pair of rear support elements.

Referring to FIG. 1, a vehicle article carrier system 10 (hereinafter simply "system 10") is shown in accordance with one embodiment of the present disclosure. The system 10 may include a first pair of (i.e., first and second) front support elements 12a and 12b fixedly secured generally parallel to one another to an outer body surface 14 (e.g., roof surface) of a vehicle 16, a second pair of (i.e., third and fourth) rear support elements 18a and 18b fixedly secured generally parallel to one another and to the outer body surface 14, a first pivotally secured "swing-in-place" ("SIP") cross bar 20 assembly, and a second or fully removable cross bar assembly 22. FIG. 1 shows the system 10 with both of the cross bar assemblies 20 and 22 in their stowed positions disposed generally parallel with, and positioned over, pairs of the front and rear support elements 12a and 12b, and 18a 18b, respectively. FIGS. 2A and 2B show the cross bars 20 and 22 two different operative configurations or positions. FIG. 2A shows the removable cross bar assembly 22 secured in a forward position on the rear support elements 18a and 18b, while FIG. 2B shows the removable cross bar assembly 22 secured at a rearward most position on the rear support elements 18a and 18b. The ability to secure the removable cross bar assembly 22 in two different locations significantly enhances the utility of the system 10 by allow the spacing of the cross bars assemblies 20 and 22 to be selected to best match the articles being supported on the cross bars assemblies, or to best match the spacing of the cross bar assemblies to the implement being secured to the cross bar assemblies (e.g., bicycle rack, luggage carrier, ski rack, kayak carrier, etc.).

When in either of the stowed or operative positions, at least portions of the cross bar assemblies 20 and 22 rest within recessed sections 26 of the front support elements 12a and 12b and recessed sections 28 of the rear support elements 18a and 18b, respectively. This enables the cross bar assemblies 20 and 22 to have a low, aerodynamic and aesthetically pleasing profile. When in the stowed positions, the cross bar assemblies 20 and 22 also form the appearance of being integral portions of the front support elements 12a and 12b, and the rear support elements 18a and 18b.

Figure 5:
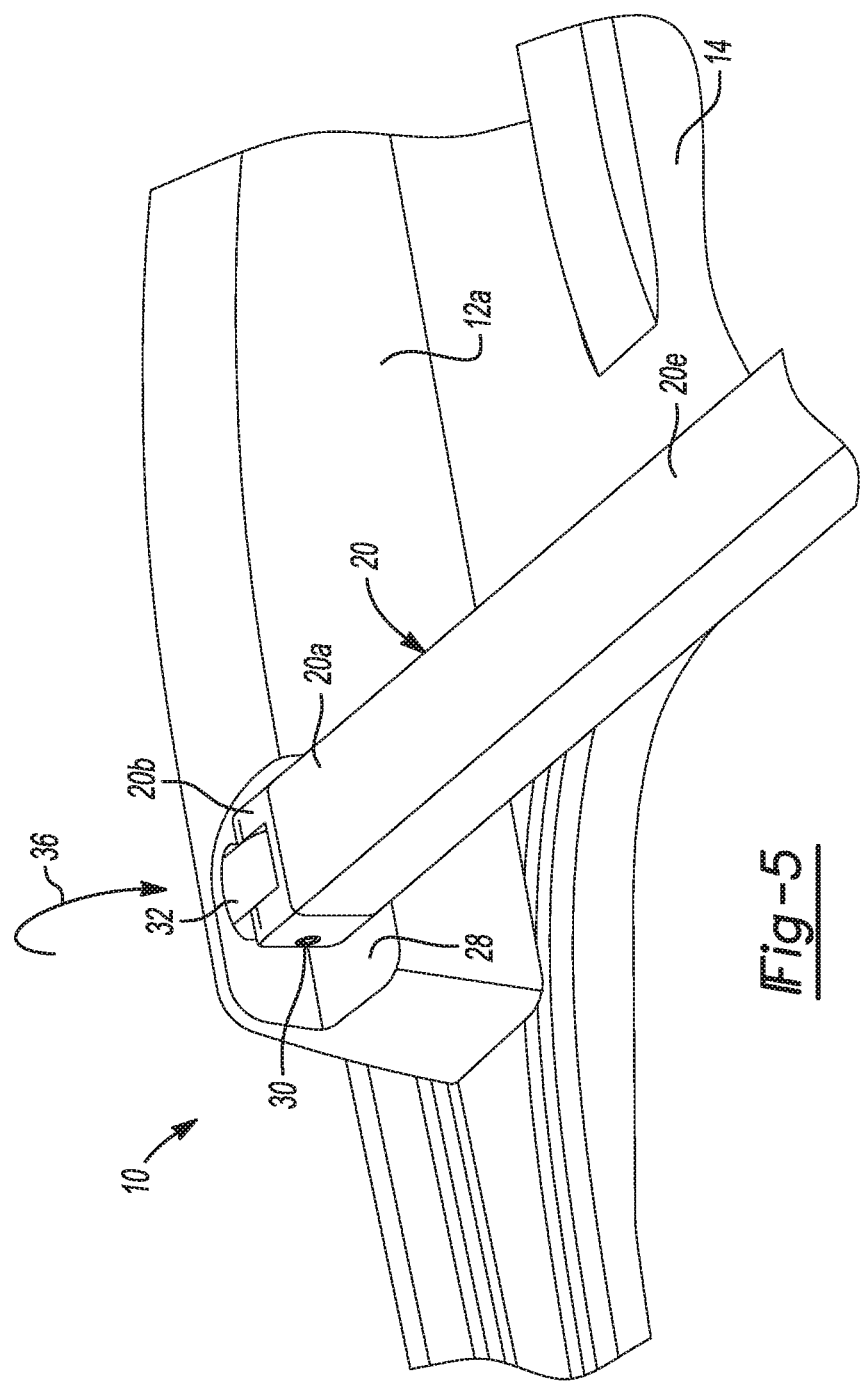
FIG. 5 is a view of the end of the cross bar assembly of FIG. 4 after the cross bar assembly has been lowered into its operative position.

With reference to FIG. 3-5, a pivotally secured end 20a of the cross bar assembly 20 is shown in greater detail. End 20a of the cross bar assembly 20 includes a clevis 20b which is secured to a pivot post 32 via a pivot pin 30. The pivot pin 30 extends through a bore in the pivot post 32, which enables the pivotally secured end 20a of the cross bar assembly 20 to be pivoted upwardly relative to the pivot post 32. The end 20a of the cross bar assembly 20 may be lifted up to a maximum angle of about 90 degrees relative to the outer body surface 14, and then rotated (or swiveled) 90 degrees, as indicated by arrow 34 in FIG. 4, before being lowered, as indicated by arrow 36 in FIG. 5, into its operative position down onto the front support element 12b.

Figure 6:
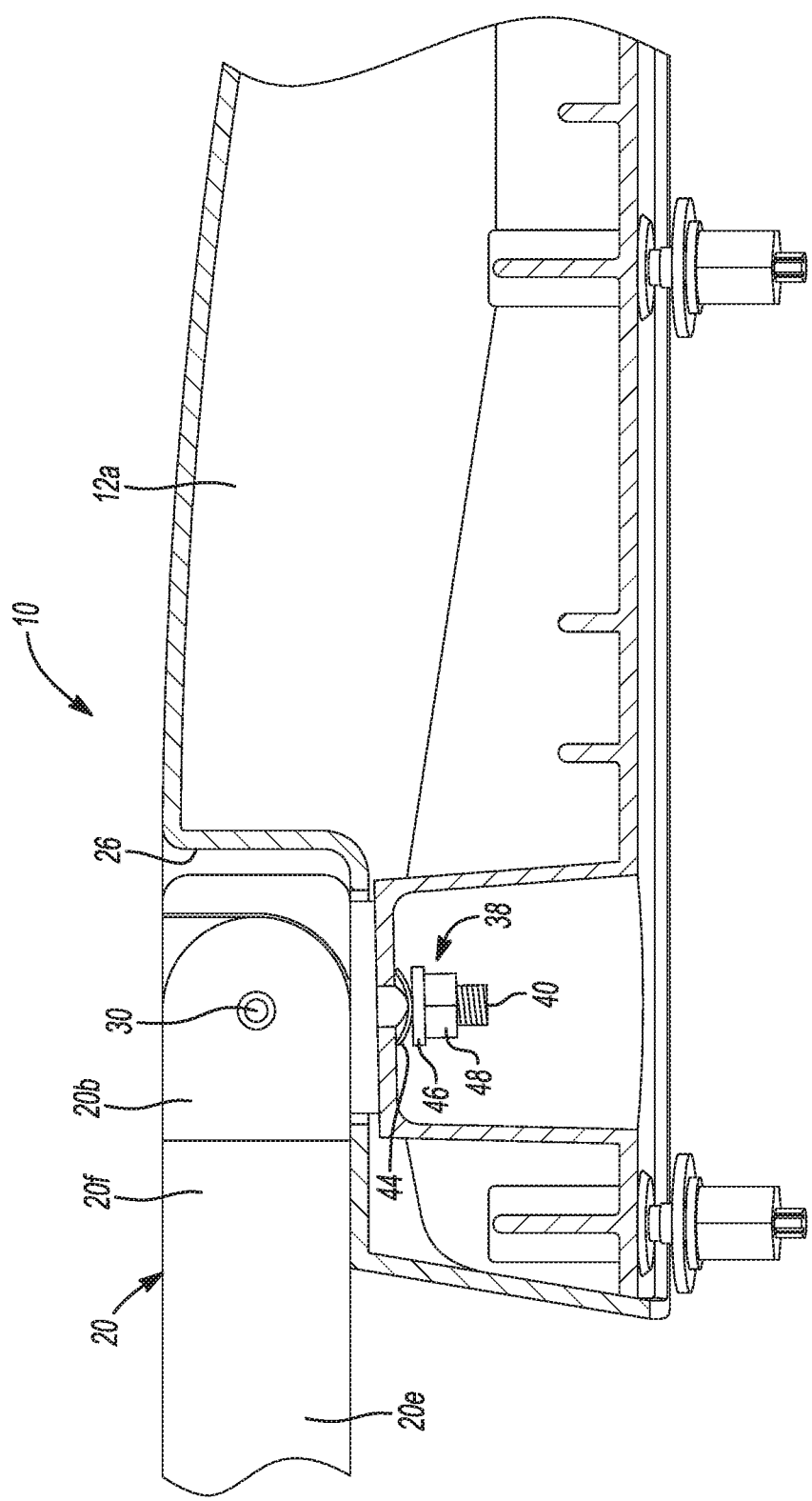
FIG. 6 is a partial cross sectional side view of one of the front support elements showing the components which enable pivoting and swiveling motion of the front pivotally secured cross bar assembly.
Figure 7:
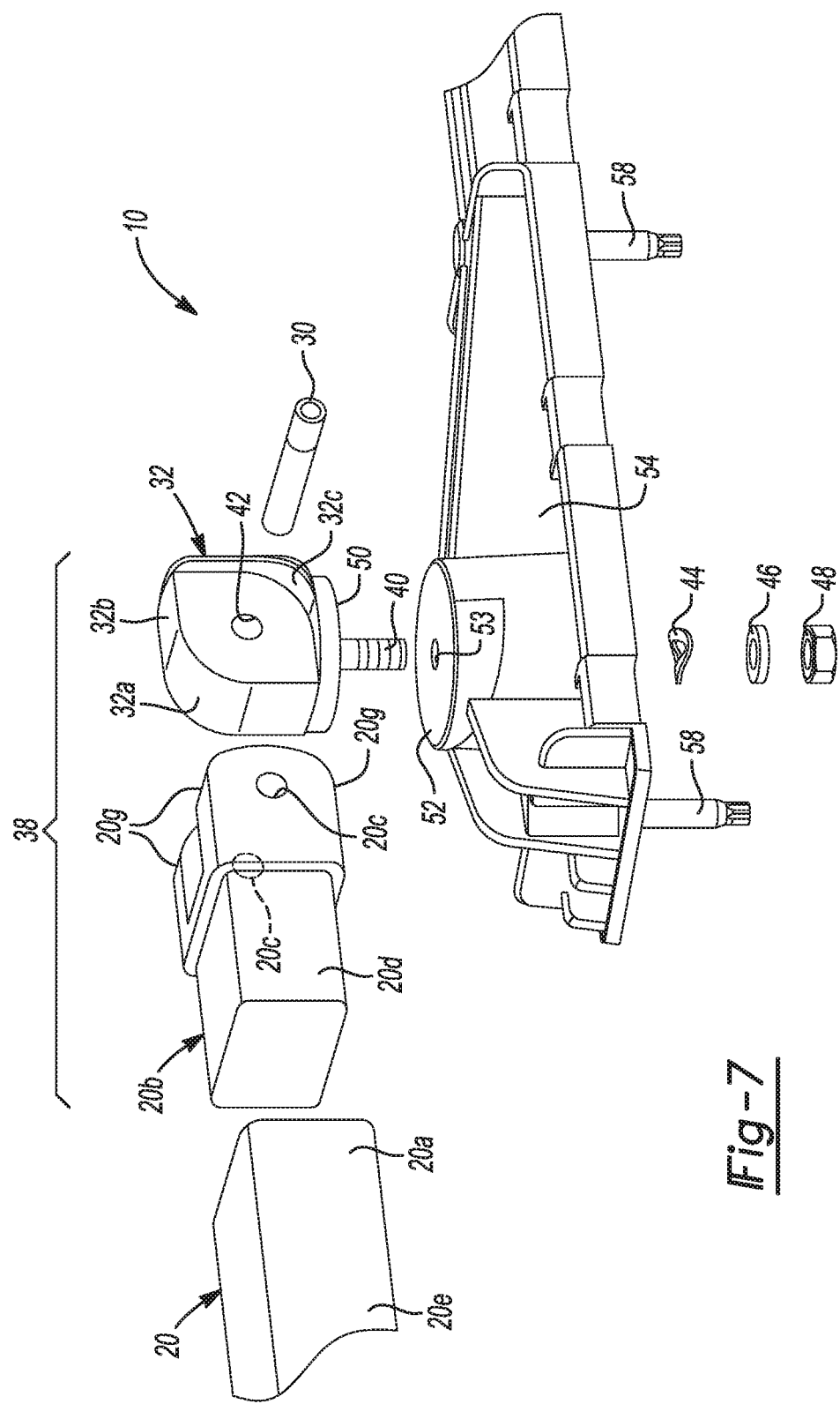
FIG. 7 is an exploded perspective view of the components shown in FIG. 6 which enable pivotal and swiveling motion of the front pivotally secured cross bar assembly.

FIGS. 6 and 7 illustrate a pivot/rotation assembly 38 which enables the rotational (i.e., swiveling) and pivoting motion of the cross bar assembly 20. The pivot/rotation assembly 38 includes the pivot post 32, which has a threaded stud 40. The threaded stud 40 may be insert molded into the pivot post 32 or otherwise non-removably secured thereto in any suitable manner. The pivot post 32 also includes and a bore 42 for receiving the pivot pin 30. The pivot/rotation assembly 38 also may be considered to include the clevis 20b, which is inserted in the end 20a of the cross bar assembly 20. Operably associated with the pivot post 32 is a Belleville washer 44, a rubber washer 46 and a threaded nut 48. The Belleville washer 44 provides tension on the pivot post 32 to provide a secure attachment to the front support element 12 without limiting the ability of the pivot post to swivel when the cross bar assembly 20 is being moved between its stowed and operative positions. The clevis 20b includes a pair of aligned bores 20c for receiving the pivot pin 30. The pivot pin 30 secures the pivot post 32 to the clevis 20b to allow pivotal movement of the pivot post. The clevis 20b may have a neck portion 20d which is inserted into end 20a of the cross bar assembly 20. In this regard it will be appreciated that each of the cross bar assemblies 20 and 22 maybe formed with a tubular section 20e. Tubular section 20e of the cross bar assembly receives the neck portion 20d at end 20a. Independent fastening elements (not shown) may be used to secure the clevis 20b to the end 20a of the cross bar 20.

Referring further to FIG. 7, the pivot post 32 also may include a curved corner 32a and a flat surface 32b. Curved corner 32a provides clearance to enable the clevis 20b to be rotated into an upwardly extending position, as shown in FIG. 4, while flat surface 32b helps to provide a positive stop to prevent over travel of the cross bar assembly 20 when lifting it into a vertically oriented position. The pivot post 32 may also include a pair of laterally arranged curved surfaces 32c (only one being visible in FIG. 7) that accommodate curved edge portions 20g of the clevis 20b to enable rotation of the clevis between substantially horizontal and vertical positions. The pivot post 32 includes a flat lower surface 50 that rests on a flat support surface 52 of a frame structure 54 of the front support element 12a. A hole 53 in the flat support surface 52 allows the threaded stud 40 to pass through the flat support surface so that the threaded stud can be secured by the threaded nut 48 from an opposite side of the frame structure 54. The frame structure 54 may be secured to the outer body surface 14 using fasteners 58 (e.g., RIVNUT® style fasteners). With brief reference to FIG. 1, the support element 12a may include a decorative cover 56 which is attached with a friction fit over and to the frame structure 54. The remaining support elements 12b, 18a and 18b may have a similar or identical frame/cover structure, which is well known in the art and therefore will not be shown in detail for support elements 12b, 18a and 18b.

Figure 8:
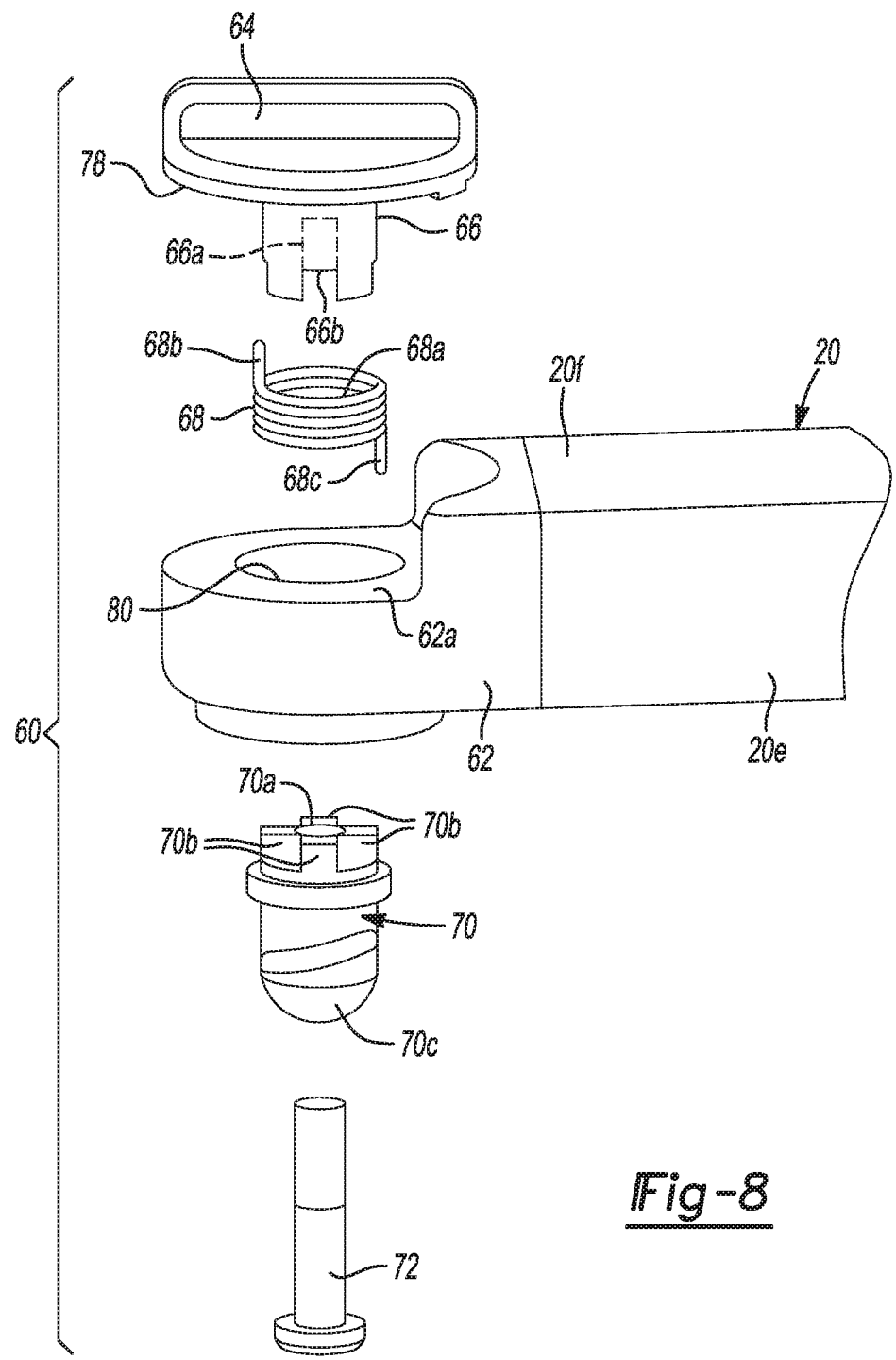
FIG. 8 is an exploded perspective view of the latching assembly used with each of the cross bar assemblies of the vehicle article carrier system.
Figure 9:
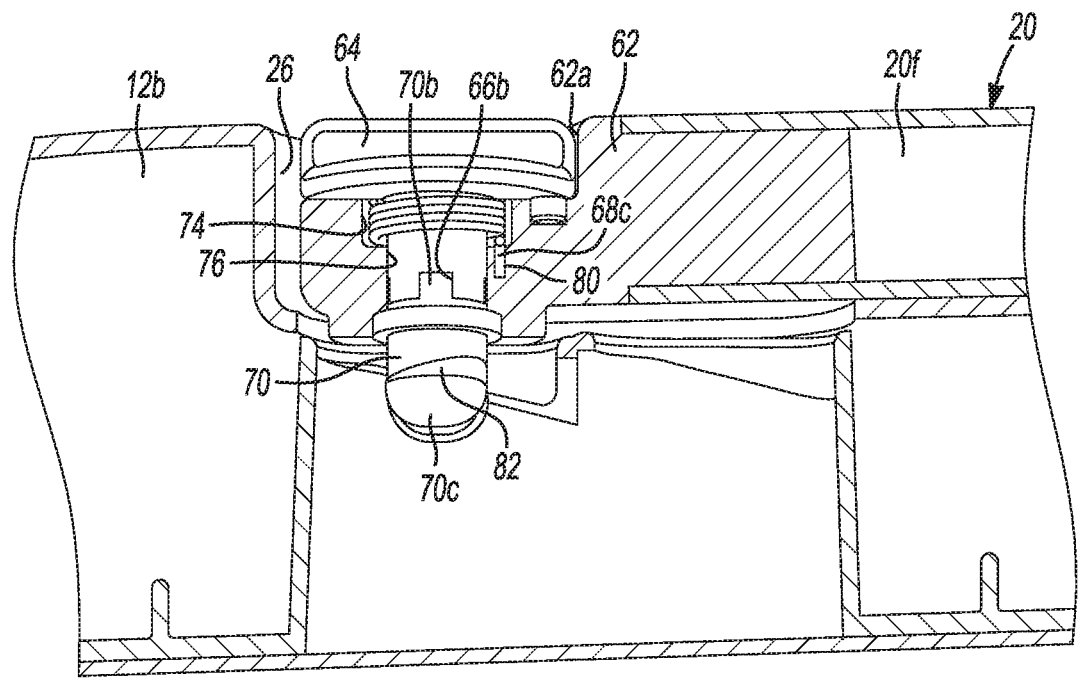
FIG. 9 is a partial cross sectional perspective side view of the latching assembly in position to secure its associated cross bar assembly to one of the support elements.

Referring to FIGS. 8 and 9, a latching assembly 60 which is carried at both ends of the removable cross bar assembly 22, and at end 20f of the cross bar assembly 20 opposite to end 20a (shown in FIG. 1), is shown in greater detail. The latching assembly 60 includes a housing 62 which is inserted into end 20f of the tubular section 20e of the cross bar assembly 20 and held thereto via conventional threaded fasteners (not shown). The latching assembly 60 may further include a user graspable actuating element 64, which in this example is shaped like a knob, which rests in a relief area 62a formed on the housing 62. The actuating element 64 has a neck portion 66 with a threaded recess 66a, a torsion spring 68, a locking element 70 having a bore 70a, projections 70b and a head portion 70c. A threaded retainer 72 extends through the bore 70a, through a central opening 68a in the torsion spring 68 and into the threaded recess 66a to hold the locking element 70 secured to the actuating element 64 and keyed against rotational movement relative to the actuating element. To help key the locking element 70 to the actuating element 64 the projections 70b engage within notches 66b formed at a distal end of the neck portion 66. When fully assembled, the torsion spring 68 is seated in a recess 74 of the housing 62, as shown in FIG. 9. Portions of both of the neck portion 66 and the locking element 70 extend into a bore 76 which is concentric with the recess 74.

With further reference to FIG. 8, the torsion spring 68 includes arm portions 68b and 68c. Arm portion 68b engages within a blind hole (not shown) in an underside 78 of the actuating element 64, while arm portion 68c engages in a blind hole 80 (FIG. 9) in the housing 62. When fully assembled as shown in FIG. 9, the torsion spring 68 continuously biases the actuating element 64 rotationally into a locked orientation. Thus, the user is required to apply a small amount of rotational force against the biasing force of the torsion spring 68 when grasping and rotating the actuating element 64 into an unlocked orientation.

Figure 10:
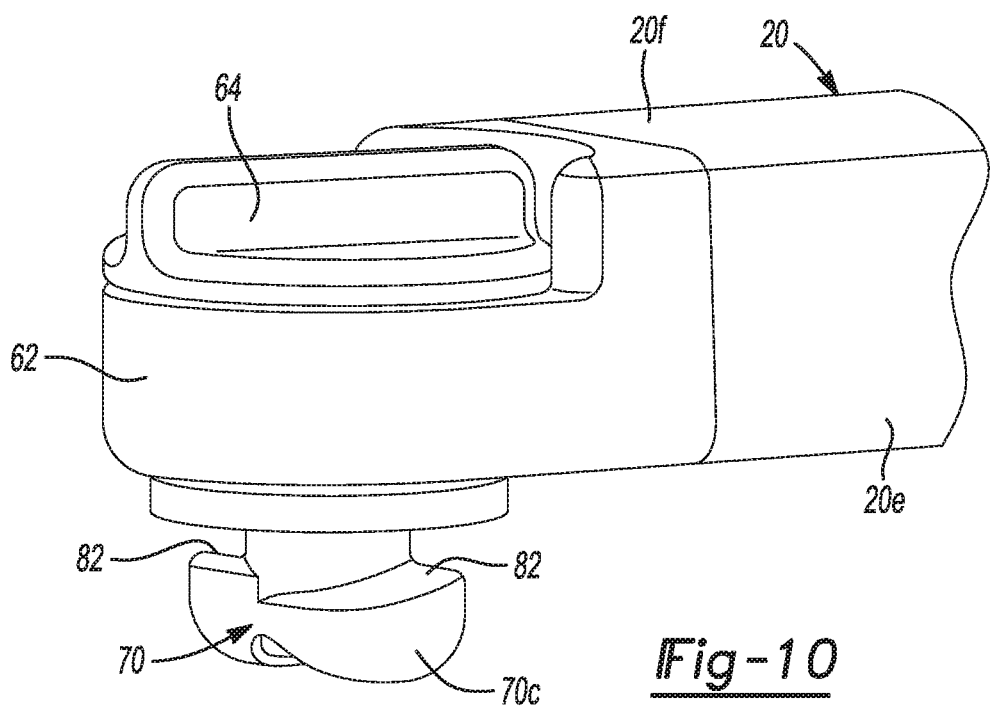
FIG. 10 is an enlarged perspective view of one end of the front cross bar assembly showing the assembled latching assembly of FIG. 9.

Referring further to FIG. 10, the head portion 70c of the locking element 70 can be seen to form somewhat of a rectangular shape that includes a pair of angled camming surfaces 82 at its opposite ends. The camming surfaces 82 are further angled to curve opposite to one another so that when the locking element 70 is rotated by a corresponding rotational movement of the actuating element 64 into a locked orientation, both camming surfaces 82 work cooperatively to draw the housing 62 down and to clamp it to the frame structure 54.

Figure 11:
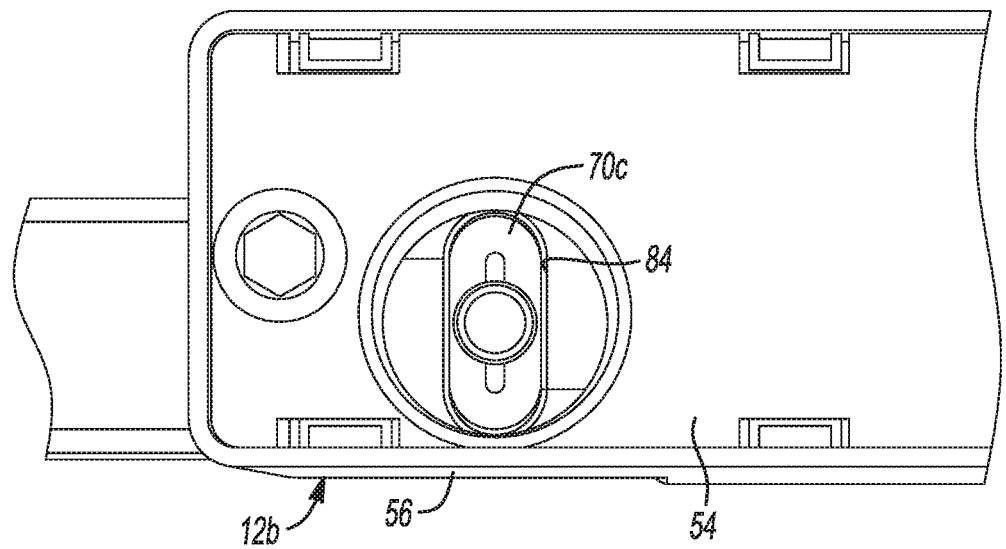
FIG. 11 is a plan view of an undersurface of a frame structure associated with one of the support elements illustrating how a head portion of the latching assembly is orientated just prior to engaging with the frame structure to secure the associated cross bar assembly to the support element.
Figure 12:
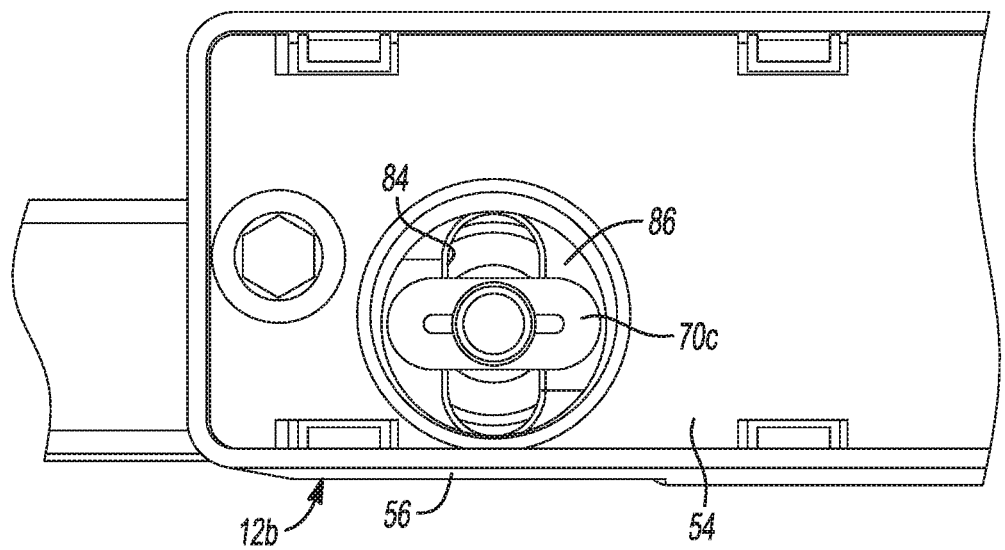
FIG. 12 shows the head portion of the latching assembly after having been rotated 90 degrees from the position shown in FIG. 11 to latch the associated cross bar assembly to the support element.

With reference to FIGS. 11 and 12, the engagement of the locking element 70 with the frame structure 54 of the front support element 12b can be seen in greater detail. The frame structure 54 includes a slot 84 which is dimensioned to receive the head portion 70c of the locking element 70 therethrough when the actuating element 64 is in its unlocked orientation. When in the orientation shown in FIG. 11, the head portion 70c can be passed through the slot 84 when the housing 62 is positioned over and lowered into the recessed section 26 of the front support element 12b. The biasing force of the torsion spring 68 requires the user to maintain the actuating element 64 in its unlocked orientation as the head portion 70c is lowered through the slot 84. Once the housing 62 is fully seated in the recessed section 26, the user turns the actuating element about 90 degrees into the position shown in FIG. 12. The camming surfaces 82 on the head portion 70c pull the housing 62 down slightly into the recessed section 26 and clamp it tightly to the frame structure 54 as they engage against a lower wall surface 86 of the frame structure. As the user releases the actuating element 64, the torsion spring 68 exerts a biasing force that helps to maintain the locking element 70 in its locked orientation. Optionally, to further assist in maintaining the locking element 70 in its locked orientation, the camming surfaces 82 could each incorporate flat sections and/or a slight protrusion that engages within a notch or small recess in the lower wall surface 86 when the locking element 70 is fully rotated into its locked position.

It will be appreciated that while the pivotally secured cross bar assembly 20 has the latching assembly at only one end (i.e., end 20b), that the removable cross bar assembly 22 has the latching assembly 60 at both ends thereof. Likewise, while only the front support element 12b incorporates the slot 84 to accommodate the head portion 70c, the rear support elements 18a and 18b each incorporate three locations 88, 90 and 92 where the slot 84 is included. Referring briefly to FIGS. 2A and 2B, locations 88 and 90 provide two different locations where the removable rear cross bar assembly 22 may be attached. Providing two such mounting locations 88 and 90 provides the user with a degree of variability in the spacing of the two cross bar assemblies 20 and 22 to better accommodate article carrying implements such as bicycle racks, ski carrier racks, canoe/kayak carrier racks, luggage containers, etc. Locations 92 provide attachment points to secure the cross bar assemblies 20 and 22 in their stowed orientations, as shown in FIG. 1. In this regard it will be appreciated that the slot 84 is rotated 90 degrees for locations 92, as compared to its orientation at locations 88 and 90. This is because when the cross bar assemblies 20 and 22 are oriented in their stowed positions laying over the rear support elements 18a and 18b, and the actuating element 64 of each cross bar assembly is then used to rotate its associated head portion 70c to its locked orientation (FIG. 12), the slot 84 needs to be orientated 90 degrees from its orientation at locations 88 and 90 for the head portion 70c to be able to lock onto the rear support elements 18.

When using the system 10, the first unlocks and removes the removable cross bar assembly 22 by rotating the actuating elements 64 into their unlocked positions and then lifting the removable cross bar assembly 22 off from its associated pair of support elements 12b and 18b. End 20f of the pivotally secured cross bar assembly 20 may then be unlocked from the rear support element 18a by rotating the actuating element 64 associated with the end 20f to its unlocked position. End 20f of the cross bar assembly 20 may be lifted away from support element 18a into the position shown in FIG. 4. The cross bar assembly 20 may then be rotated 90 degrees about arrow 34 and then lowered into the position shown in FIG. 5, with housing 62 of latching assembly 60 resting in the recess 26 of front support element 12b, as shown in FIG. 2B. The actuating element 64 may then be rotated into its locked position which securely clamps end 20f to the front support element 12b. The user may then position the removable cross bar assembly 22 over either the mounting locations 88 or 90, and then secure the cross bar assembly 22 to the rear support elements 18a and 18b by first rotating one of the actuating elements 64 at one end of the cross bar assembly 22 to its unlocked position, and then rotating it into its fully locked position. The same operation is then performed at the other end of the removable cross bar assembly 22.

While the pivotally secured cross bar assembly 20 has been illustrated in the example embodiment of FIGS. 1, 2A and 2B as being the front most cross bar assembly, it will be appreciated that the system 10 could just as easily be configured to have the pivotally secured cross bar assembly 20 secured toward the rear of the outer body surface 14 of the vehicle 16, and the removable cross bar adapted to be secured near the front most part of the outer body surface 14. This would essentially involve constructing the front support elements 12a and 12b to have the mounting locations 88, 90 and 92, while the rear support elements 18a and 18b would be constructed to have the construction details of the front support elements 12 and 12b.

Still further, another option would be to construct the pivotally secured cross bar assembly 20 instead as a fully removable cross bar assembly. Thus, in this example cross bar assemblies 20 and 22 would be identical in construction. For this embodiment, the front support element 12a would be identical in construction to support element 12b.

Still another option would be to provide the rear support elements 18a and 18b with an even longer length than shown in FIGS. 1, 2A and 2B, and to provide more than two possible mounting locations where the removable cross bar could be located at in its operative configuration. Thus, instead of just two different mounting locations 88 and 90 (FIGS. 2A and 2B) for the removable cross bar assembly 22, three or more longitudinally spaced apart mounting locations could be provided. This would provide an even greater degree of variability in the spacing of the cross bar assemblies 20 and 22.

The system 10 in its various embodiments provides a clean, aesthetically appealing, low profile and highly aerodynamically efficient vehicle article carrier system which allows the cross bar assemblies 20 and 22 to be secured in either stowed or operative orientations. A significant advantage is that no tools are required when releasing and reattaching the cross bar assemblies between their stowed and operative positions. The cross bar assemblies 20 and 22 can be moved from their stowed orientations to their operative orientations in just a minute or two by a single individual. The variable spacing of the cross bar assemblies 20 and 22 provides an additional degree of flexibility in configuring the system 10 for use with a wide variety of aftermarket article carrier implements. Whether in stowed or operative positions, the upper surfaces of the cross bar assemblies 20 and 22 are generally flush with the upper surfaces of the support elements 12 and 18, providing a clean, aesthetic and aerodynamic appearance, and also potentially helping to reduce wind noise.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for securing articles elevationally above an outer body surface of a vehicle, the system comprising:
   first and second front support elements secured in spaced apart relation to one another to the outer body surface adjacent a first portion of the vehicle;
   the second front support element including an opening;
   third and fourth rear support elements secured in spaced apart relation to one another to the outer body surface adjacent a second portion of the vehicle;
   a first cross bar secured to the first front support element at a first end thereof, and positionable in an operative orientation extending perpendicularly between the first and second front support elements, and in a stowed orientation extending parallel to, and secured to, either the first front support element or the third rear support element;
   a second cross bar having first and second ends thereof;
   the first cross bar including a latching assembly and an actuating element at a second end thereof for controlling operation of the latching assembly, the latching assembly further including a locking element having a head portion shaped to match the opening, and to be insertable through the opening when the second end of the first cross bar is positioned over and on the second front support element, and the head portion further having at least one angled camming surface, and wherein the head portion is further shaped for camming engagement with a portion of the second front support element adjacent to the opening, when the head portion is rotated into a latched position;
   the second cross bar including latching assemblies at the first and second ends thereof; and
   the second cross bar being secureable at two operative, longitudinally spaced apart positions on the third and fourth rear support elements to enable selective spacing of the second cross bar relative to the first cross bar when the first and second cross bars are in both in their operative positions; and
   wherein each of the third and fourth support elements include first, second and third securing openings, with the third securing opening being orientated 90 degrees from the first and second securing openings, to enable securing of the second end of the first cross bar in the stowed orientation, and securing of the second cross bar at either one of two longitudinally spaced apart positions on the rear third and fourth support elements, and also to the second support element to place the second cross bar in a stowed orientation.

2. The system of claim 1, wherein the first cross bar is pivotally latched at the second end thereof to the first front support element.

3. The system of claim 1, wherein the third and fourth rear support elements each include;
   a first operative mounting position at which the second cross bar is attachable to extend between the third and fourth rear support elements, to provide a first spacing from the first cross bar when the first cross bar is in the operative position;
   a second operative mounting position at which the second cross bar is attachable to extend between the third and fourth rear support elements, to provide a second spacing from the first cross bar when the first cross bar is in the operative position; and
   wherein the second cross bar may be configured in a stowed position in which the second cross bar is attached at one end thereof to the fourth rear support element, and at an opposite end thereof to the second front support element, to place the second cross bar in the stowed position on the second front support element and the fourth support element, and further to enable one end of the first cross bar to be secured to the third rear support element to enable the first cross bar to be pivoted into, and secured in, a stowed position on the first front support element and the third rear support element.

4. The system of claim 3, wherein:
   the second cross bar includes a latching assembly at each end thereof for securing the second cross bar in either the operative or stowed positions; and
   the latching assembly at the first end of the first cross bar enables removably coupling the first cross bar in either the operative position or the stowed position.

5. A vehicle article carrier system for securing articles elevationally above an outer body surface of a vehicle, the system comprising:
   first and second front support elements secured in spaced apart relation to one another to the outer body surface adjacent a first portion of the vehicle, the second front support element including an opening formed therein;
   third and fourth rear support elements secured in spaced apart relation to one another to the outer body surface adjacent a second portion of the vehicle;
   a first cross bar pivotally secured to the first front support element via a pivot rotation assembly at a first end thereof, and positionable in an operative orientation extending perpendicularly between the first and second front support elements, and a stowed orientation extending parallel to the first front support element and the third rear support element;
   a second cross bar having first and second ends thereof;
   the first cross bar including a latching assembly and an actuating element at a second end thereof;
   the second cross bar including a latching assembly and an actuating element at each end thereof;
   said third and fourth rear support elements each including;
   a first securing opening forming a first operative mounting location at which the second cross bar is attachable at said first and second ends thereof to extend between the third and fourth rear support elements, to provide a first spacing from the first cross bar when the first cross bar is in the operative position;
   a second securing opening forming a second operative mounting location at which the second cross bar is attachable to extend between the third and fourth rear support elements, to provide a second spacing from the first cross bar when the first cross bar is in the operative position;
   a third securing opening forming a third mounting location, the third mounting location forming a stowed mounting location at which the second cross bar is attachable at one end thereof to the fourth rear support element, and at an opposite end thereof to the second front support element, to place the second cross bar in the stowed mounting location on the second front support element and the fourth rear support element, and the third rear support element enabling one end of the first cross bar to be secured thereto, to enable the first cross bar to be pivoted into, and secured in, a stowed position on the first front support element and the third rear support element;

the first and second securing openings on each one of the third and fourth rear support elements being arranged 90 degrees from the third securing opening;

said latching assemblies at the ends of said second cross bar configured to secure the second cross bar in either the operative or stowed orientations; and said latching assembly of the first cross bar enabling removably coupling the first cross bar in either the operative orientation or the stowed orientation; and the latching assembly at the second end of the first cross bar including a locking element having a head portion shaped to match the opening, and to be insertable through the opening when the second end of the first cross bar is positioned over and on the second front support element, and the head portion further having at least one angled camming surface, and wherein the head portion is further shaped for rotational camming engagement with a portion of the second front support element adjacent to the opening, when the head portion is rotated into a latched position.

6. The system of claim 5, wherein the pivot rotation assembly includes:
a clevis secured to the first end of the first cross bar;
a pivot post secured for rotational movement to the first front support element about a first axis, and to the clevis via a pin to allow rotational movement of the clevis about a second axis orthogonal to the first axis.

7. The system of claim 6, wherein the pivot post includes a laterally extending surface which helps to define a range of rotational movement of the clevis about the second axis.

8. The system of claim 6, wherein the pivot post and the clevis are movable simultaneously about the first and second axes, respectively.

9. The system of claim 5, wherein each said actuating element associated with each said latching assembly comprises a manually graspable actuating element secured to its associated said cross bar for rotational movement between a locked position and an unlocked position.

10. The system of claim 9, wherein each said latching assembly further includes a torsion spring for biasing the actuating element into the locked position.

11. The system of claim 10, wherein each said latching assembly at the first and second ends of the second cross bar further includes a locking element having a head portion having a pair of angled camming surfaces; and
wherein each said head portion is cammingly engaged with one of the first, second or third securing openings when the head portion is rotated into a second angular orientation using the manually graspable actuator element.

12. The system of claim 11, wherein:
the actuating element includes a neck portion having at least one cutout; and
the locking element includes at least one projection which engages with the cutout to cause rotational movement of the locking element in response to a corresponding rotational movement of the actuating element.

13. The system of claim 5, wherein the first and second cross bars have upper surfaces that rest flush with an upper surface of each of the support elements when the cross bars are in their stowed positions.

14. The system of claim 5, wherein the first and second cross bars have upper surfaces that rest flush with an upper surface of each of the support elements when the cross bars are in their operative positions.

15. The system of claim 5, wherein the second cross bar is removable from the third and fourth rear support elements.

16. A vehicle article carrier system for securing articles elevationally above an outer body surface of a vehicle, the system comprising:
first and second front support elements secured in spaced apart relation to one another to the outer body surface adjacent a first portion of the vehicle, the second front support element including a first opening;
third and fourth rear support elements secured in spaced apart relation to one another to the outer body surface adjacent a second portion of the vehicle, and including second and third openings respectively;
a first cross bar pivotally secured to the first front support element via a pivot rotation assembly at a first end thereof, and positionable in an operative orientation extending between the first and second front support elements, and a stowed orientation extending parallel to the first front support element and the third rear support element;
the pivot rotation assembly enabling rotation of the first cross bar simultaneously about two orthogonal axes, and limiting pivotal movement to a predetermined degree about one of the two axes;
a second cross bar having first and second ends;
the first cross bar including a latching assembly at a second end thereof;
the second cross bar including latching assemblies at both of the first and second ends thereof for securing the second cross bar in either the operative or stowed orientations;
said third and fourth rear support elements each including;
a first operative mounting location at which the second cross bar is attachable to extend between the third and fourth rear support elements, to provide a first spacing from the first cross bar when the first cross bar is in the operative position;
a second operative mounting location at which the second cross bar is attachable to extend between the third and fourth rear support elements, to provide a second spacing from the first cross bar when the first cross bar is in the operative position; and
the fourth rear support element enabling a third stowed mounting configuration in which the second cross bar is attached at one end thereof to the second front support element, and at an opposite end thereof to the fourth rear support element, to place the second cross bar in the third stowed mounting configuration extending parallel to the second front support element and the fourth rear support element;
the latching assemblies each including a locking element having a head portion shaped to match the each of the first, second and third openings, and to be insertable through at least one of the first, second and third openings, and rotated to provide camming engagement to secure the first and second cross bars to selected ones of front or rear support elements; and wherein the third support element includes a pair of securing openings spaced apart from one another and orientated 90 degrees from one another, to enable securing of the first cross bar in the stowed position and securing of the second cross bar at least at one of two longitudinally spaced apart positions on the rear third and fourth support elements.

17. The system of claim 16, wherein each one of the locking elements includes a head portion having a pair of opposed camming surfaces for assisting in providing camming engagement of the locking element with a selected one of the slots.

* * * * *